United States Patent

Schalz et al.

Patent Number: 5,539,573
Date of Patent: Jul. 23, 1996

[54] UNIVERSAL FOLDING CONDENSER FOR MICROSCOPES

[75] Inventors: Karl-Josef Schalz, Weilburg; Werner Stahl, Solms, both of Germany

[73] Assignee: Leica Mikroskopie und Systeme Systeme GmbH, Wetzlar, Germany

[21] Appl. No.: 211,952

[22] PCT Filed: Sep. 15, 1993

[86] PCT No.: PCT/DE93/00868

§ 371 Date: May 4, 1994

§ 102(e) Date: May 4, 1994

[87] PCT Pub. No.: WO94/07169

PCT Pub. Date: Mar. 31, 1994

[30] Foreign Application Priority Data

Sep. 19, 1992 [DE] Germany ............ 42 31 440.2

[51] Int. Cl.⁶ .................. G02B 21/00; G02B 21/06
[52] U.S. Cl. .................. 359/381; 359/384; 359/388; 359/390; 359/393
[58] Field of Search .................. 359/388, 381, 359/393, 390, 384

[56] References Cited

U.S. PATENT DOCUMENTS 3,833,283  9/1974  Stankewitz .................. 359/388
4,136,927  1/1979  Lisfeld .................. 359/388
4,573,772  3/1986  Endo et al. .................. 359/388
4,807,980  2/1989  Dietrich et al. .................. 359/388

FOREIGN PATENT DOCUMENTS 2355308  5/1977  France .
2116625  10/1972  Germany .
3700965  7/1988  Germany .

Primary Examiner—Thong Q. Nguyen
Assistant Examiner—Mohammad Y. Sikder
Attorney, Agent, or Firm—Foley & Lardner

[57] ABSTRACT

A universal folding condenser (1) with a support plate (4), which is fastened on the microscope and has an arm (4') angled off through 90°, is described. Arranged in the support plate (4) is a fixed lens (5). Above the support plate (4) there is provided a first, rectangularly shaped swivel arm (7) with a condenser head and a lens element (2) for optional introduction into the path of the illuminating beam (11). Arranged underneath the support (4) is a second, rectangularly shaped swivel arm (8) with a second lens element (3). The two swivel arms (7, 8) are forcibly coupled by means of a shifting linkage (6) in such a way that, for objectives with low magnification, the two lens elements (2, 3) are introduced into the path of the illuminating beam (11) and, for objectives with high magnification, only the condenser head is introduced into the path of the illuminating beam (11).

5 Claims, 1 Drawing Sheet

UNIVERSAL FOLDING CONDENSER FOR MICROSCOPES

BACKGROUND OF THE INVENTION

1. Field of the Invention

The invention relates to a folding condenser for a microscope.

2. Discussion of Related Art

In the case of microscopes having a turret for receiving objectives with different magnification, these objectives are brought into the effective position alternately one after the other. However, rapid switching between these objectives also requires a corresponding adaptation of the illumination with respect to the aperture and the illuminated field. According to German patent document 2,116,625, this adaptation is achieved by a condenser in which there is provided not only a fixed basic condenser but also additional condenser lenses which can be switched into the path of the illuminating beam. These condenser lenses are connected to one another via a linkage, so that various switching positions permit a rapid adaptation of the illumination after a change of objective.

German patent document 2,626,864 discloses a further microscope universal condenser with fixed lens elements and with additional forcibly coupled lens elements, arranged in front of and behind the fixed part in the direction of the light. A lens element provided underneath the fixed lens is arranged in a swivel arm, the direction of movement of which is designed to be perpendicular to the optical axis. A further lens element is arranged on a carriage above the fixed lens and is moved perpendicularly to the optical axis and tangentially to the direction of movement of the second lens element. By means of a complex mechanical shifting linkage, the swivel movement of the arm is transferred by forced coupling into a linear movement of the carriage.

In known devices for exact forced coupling of the individual lens elements, great mechanical complexity is present. Due to the complicated mechanical guidance, the free working distance between the fixed lens and the lens elements to be switched is also small. The insertion of additional optical components for influencing the path of the illuminating beam is made more difficult as a result. Since the condenser head moved on the carriage is arranged very closely underneath the microscope stage, a corresponding recess must be provided here.

SUMMARY OF THE INVENTION

Taking the known prior art as a basis, it is therefore an object of the present invention to simplify the complicated mechanical structure of such a device and at the same time create a greater free working distance between the fixed lens element and the lens elements to be switched for the optional receiving of additional optical components.

This object is achieved according to the invention by providing a universal folding condenser with a first lens element and second and third lens elements disposed above and below the first lens element, the first lens being fixed and the second and third lens elements being alternately switchable into and out of an optical axis of the second and third lens elements for varying an aperture and an illumination field of the condenser. The condenser includes:

a) a support plate housing the first lens element, the support plate having a support arm positioned at an angle of 90° with respect to the support plate;

b) first and second pivot bearings disposed on the support arm of the support plate, the second pivot bearing being positioned above the first pivot bearing, and the first and second pivot bearings being perpendicular to the optical axis of the second and third lens elements; and c) first and second swivel arms, each having first and second limbs, the second lens element being fastened to the first limb of the first swivel arm, and the first pivot bearing being fitted to the second limb of the first swivel arm, the third lens element being fastened to the first limb of the second swivel arm, and the second pivot bearing being fitted to the second limb of the second swivel arm, wherein the second limbs of the first and second swivel arms are coupled to each other for transferring a swivelling movement.

BRIEF DESCRIPTION OF THE DRAWINGS

The invention is explained in more detail with reference to an exemplary embodiment with the aid of the diagrammatic drawings, in which.

DETAILED DESCRIPTION OF THE PREFERRED EMBODIMENT

Figure 1:
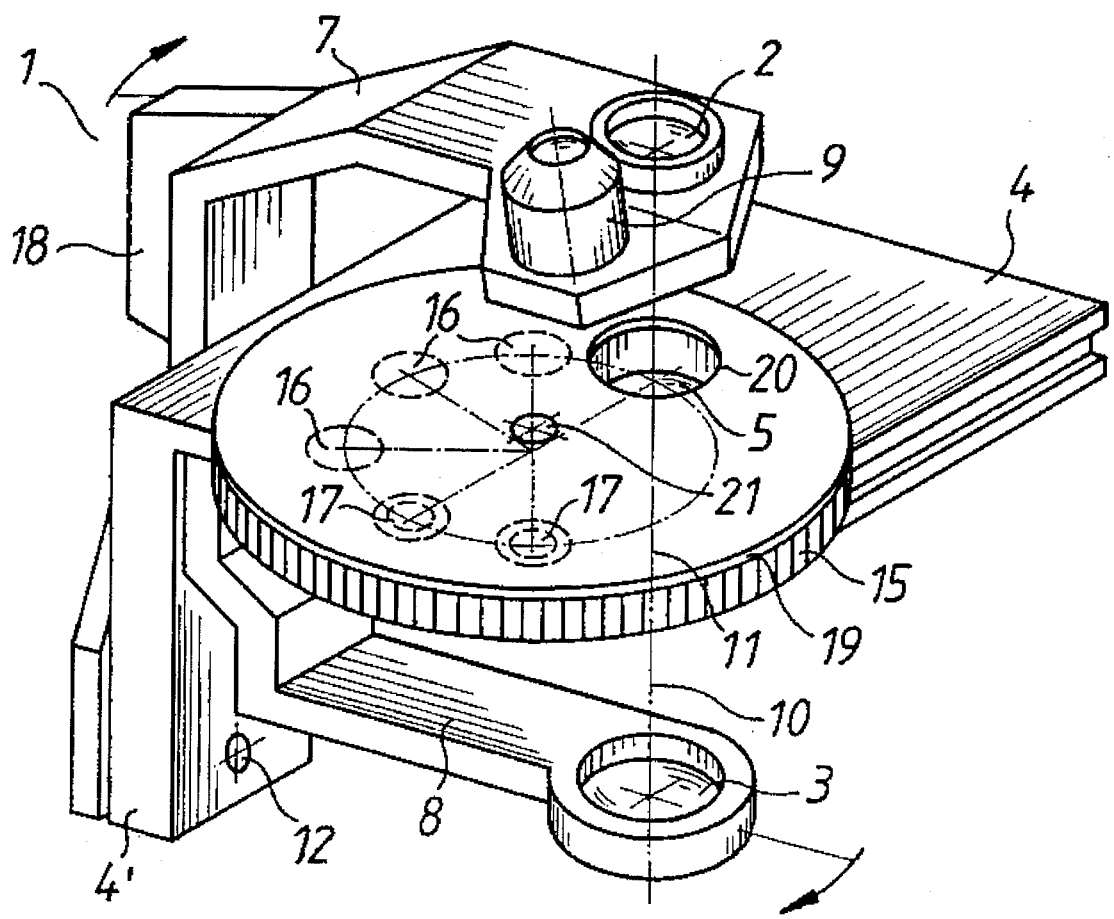
FIG. 1 shows a view of the microscope condenser

FIG. 1 shows a folding condenser 1 for a microscope with a support plate 4, which has an arm 4' angled off at 90°. Arranged above and below the support plate 4 are two rectangularly shaped swivel arms 7 and 8. The support plate 4 is fastened securely on the microscope stand (not included in the representation) or fitted into a carriage guide arranged on the stand and has a fixed lens 5 arranged in the path of the illuminating beam 11.

On the support plate 4, a turret plate 15 for receiving a plurality of light rings 16, Wollaston prisms 17 and the like, is arranged by means of a rotary bearing 21. The turret plate 15 is provided with a covering 19 for protection against external effects, which covering has a recess 20 in the region of the path of the illuminating beam 11.

One limb of the first swivel arm 7 bears a condenser head 9 and a lens element 2, while the other limb of the arm 7 is connected by means of a pivot bearing 12 to the arm 4'. The receptacles for the condenser head 9 and the lens element 2 are angled off with respect to each other, so that when the arm 7 is swivelled the optical component in the effective position is perpendicular to the illumination axis 10.

One limb of the second swivel arm 8 bears a second lens element 3, the other limb being connected by means of a pivot bearing 12' (FIG. 2) to the arm 4'. The pivot bearings 12 and 12' are respectively arranged on the opposite sides of the arm 4'.

Figure 2:
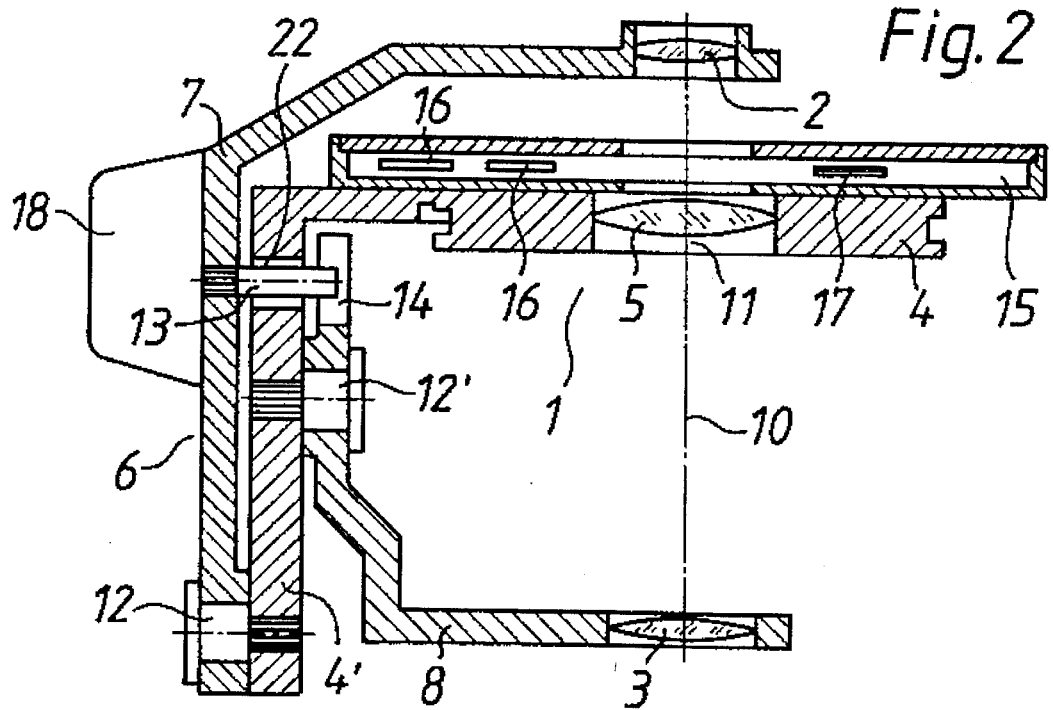
FIG. 2 shows a section through the microscope condenser.

The second lens element 3 is introduced into the path of the illuminating beam 11 synchronously together with the first lens element 2. For this purpose, the swivel arms 7 and 8 are forcibly coupled to each other by means of a pin/slot coupling 13, 14 (FIG. 2). In order to move the two swivel arms 7 and 8 in the direction of the arrow, a handle 18 is securely arranged on the arm 7.

FIG. 2 shows a section through the microscope condenser 1. In the embodiment described here, the two lens elements 2 and 3 are in an effective position for the Köhler illumination of a low-power scanning objective. Owing to the representation and the angular arrangement of the receptacles, the condenser head 9 on the first swivel arm 2 is concealed.

The swivel arm 7 is connected by means of the pivot bearing 12 to the arm 4'. On the swivel arm 7 there is securely arranged a pin 13, which engages via an elongate hole 22 provided in the arm 4' in a slot 14 in the second swivel arm 8, which slot is arranged perpendicular to the pin 13.

The two swivel arms 7 and 8 can be moved by pulling or pushing on the handle 18. The swivelling movement of the two lens elements 2 and 3 is limited by the striking of the pin 13 against the ends of the elongate hole 22. The transfer of the movement to the second swivel arm 8 takes place by the guidance of the pin 13 on the inner walls of the slot 14. The movements of the two lens elements 2 and 3 run in the same direction on two circular paths.

| List of reference numerals | |
|---|---|
| 1 | folding condenser |
| 2 | first lens element |
| 3 | second lens element |
| 4 | support plate |
| 4' | angled-off arm of 4 |
| 5 | fixed lens |
| 6 | shifting linkage |
| 7 | first swivel arm |
| 8 | second swivel arm |
| 9 | condenser head |
| 10 | illumination axis |
| 11 | path of illuminating beam |
| 12, 12' | pivot bearings |
| 13 | pin |
| 14 | slot |
| 15 | turret plate |
| 16 | light rings |
| 17 | Wollaston prisms |
| 18 | handle on 7 |
| 19 | covering for 15 |
| 20 | recess on 19 |
| 21 | rotary bearing for 15 |
| 22 | elongate hole |

We claim:

1. A universal folding condenser with a first lens element and second and third lens elements disposed above and below the first lens element, said first lens element being fixed and said second and third lens elements being alternately switchable into and out of an optical axis of the second and third lens elements for varying an aperture and an illumination field of the condenser, comprising:

a) a support member having a support plate for housing said first lens element, the support member having a support arm positioned at a predetermined angle with respect to the support plate;

b) first and second pivot bearings disposed on the support arm of the support plate, said second pivot bearing being positioned above the first pivot bearing, and said first and second pivot bearings being disposed perpendicular to the optical axis of the second and third lens elements; and c) first and second swivel arms, each having first and second limbs, the second lens element being fastened to the first limb of the first swivel arm, and the first pivot bearing being fitted to the second limb of the first swivel arm, the third lens element being fastened to the first limb of the second swivel arm, and the second pivot bearing being fitted to the second limb of the second swivel arm, wherein the second limbs of the first and second swivel arms are coupled to each other for transferring a swivelling movement, wherein:

the first pivot bearing is movable away from the optical axis and the first swivel arm is arranged with the first limb bearing and the second lens element to be switchable above the first lens element, the second pivot bearing is movable towards the optical axis and the second swivel arm is arranged with the first limb bearing and the third lens element to be switchable underneath the first lens element, and the first and second swivel arms and the support arm have a slot and a pin coupling extending through the first and second swivel arms and the support arm.

2. A universal folding condenser according to claim 1, wherein the second lens element and a condenser head are fitted on the first limb of the first swivel arm in a swivelling direction such that in one swivelling position of the first and second swivel arms, only the condenser head is switchable into the optical axis, and in the other swivelling position, the second and third lens elements are switchable into the optical axis.

3. A universal folding condenser according to claim 1, wherein the support arm has an elongate hole for limiting the swivelling positions of the first and second swivel arms.

4. A universal folding condenser according to claim 1, wherein a rotatably mounted turret plate is disposed on the support plate for receiving a plurality of light rings and prisms, which can be optionally introduced into the optical axis by rotation of the turret plate, and wherein the first swivel arm extends over the turret plate.

5. A universal folding condenser according to claim 1, wherein the predetermined angle is equal to 90°.

* * * * *